June 25, 1957 J. STRAUSS 2,796,799

SYSTEM FOR MONITORING MOVING PICTURE PRODUCTION

Filed Sept. 8, 1950 2 Sheets-Sheet 1

INVENTOR.
JACK STRAUSS
BY
Edward M Kendrick
Attorney

June 25, 1957 J. STRAUSS 2,796,799

SYSTEM FOR MONITORING MOVING PICTURE PRODUCTION

Filed Sept. 8, 1950 2 Sheets-Sheet 2

INVENTOR.
JACK STRAUSS
BY Elwood M. Kendrick
Attorney

United States Patent Office 2,796,799

Patented June 25, 1957

2,796,799

SYSTEM FOR MONITORING MOVING PICTURE PRODUCTION

Jack Strauss, Hollywood, Calif., assignor to Camera Vision, Inc., Beverly Hills, Calif., a corporation of Nevada Application September 8, 1950, Serial No. 183,839

9 Claims. (Cl. 88—16)

The general object of this invention is to provide a technique and means for reducing the cost and time required for producing motion pictures.

It is a striking fact that after decades of development work and technical improvement a class "A" moving picture film costs on the average $12,500 per running minute of the moving film or $375,000 for thirty minutes and a class "B" film costs on the average about $2,500 per minute for the finished performance or $75,000 for a thirty-minute reel. If any of the many attempts to reduce these costs materially had been widely fruitful, the motion picture industry itself would be a more effective factor in our culture today, and, moreover, would be instrumental in lifting television to higher levels of effectiveness.

The desirability of placing television performances on film and then using the film to put the program on the air has been widely recognized for years. The advantages are overwhelming: duplicate film can eliminate the expense of coaxial cables for station-to-station hookups; actors working more comfortably under relatively moderate lighting can relax from the pressure of time and from the necessity of memorizing whole scripts to give more natural and less fatiguing performances; since the film can be previewed, sponsers may approve the performance in advance, the show may be pre-tested by experts in judging audience reaction, the film may be edited to perfection and "name" actors can perform with complete assurance that only their best will reach the air; the film used for duplicate broadcasts is of uniform high quality in contrast to the lower quality of kinescoped programs photographed from the face of a viewing tube during a "live" performance; and, finally, film can be used for certain important effects impossible in the broadcasting of a live television show, such effects including slow motion, fast motion, and frozen motion.

These advantages of using film for television would be compelling were it not for the prohibitive cost of prevailing motion picture techniques. The most expensive television show today costs on the order of $2,000 per minute on the air or $500 per minute less than a class "B" moving picture performance and, of course, the vast majority of television programs must be put on the air at much less cost. For widespread television use, moving picture film must drop in cost to substantially less than $10,000 for a thirty-minute program.

In general, the problem of lowering the costs of motion picture production whether primarily for theater exhibition or for television use has been approached heretofore with the idea of attaining greater efficiency in the existing sequence of operations. It is true that better planning and closer scheduling, together with certain short cuts, have been valuable, especially so in certain kinds of motion picture production, but none of these advances have created any significant industry-wide trend in cost reduction.

Most of the present excessive cost in moving picture production lies in the apparent necessity for shooting five or more times as much film as will actually be used and the further necessity for holding endless conferences with numerous retakes to reach eventual agreement on the finished film.

The present invention is based on a study that traces this excessive cost back to the mental computations involved and back to the basic problem of maintaining a meeting of minds in the complex teamwork required to produce a high quality film.

Close study of the present production methods reveals that for efficient teamwork it is not enough that all the members of the team directing and controlling the actual performance, as well as the photography and the simultaneous engineering procedures be in full agreement from the very start on what is to be done and all have the same clear concept of the final result. Even with such initial basic agreement there always occurs very wide divergence of concept and thinking on the part of the individual members of the team in the course of actual shooting. It is such divergence that multiplies film footage and keeps the production team from turning out a quality film with high efficiency.

The individual deviations and digressions occur in the necessary translations of the actual scenes in front of the camera into mental versions of what the same scenes will be like on a theater screen. In this mental process of translation, the observer must, as best he can, ward off all the distractions of extraneous noise and movement at the set, must discount all the mood and atmosphere-destroying portions of the over-all scene outside the margins of the actual camera frame, must allow for the difference in viewing angle between his individual position and the camera position, must picture in mind how this three-dimensional scene will take in two dimensions, and finally must judge the scene from the viewpoint of an audience watching the story unfold in a darkened theater.

These numerous computations place a tremendous burden on the various echelons of the production team especially since the computations require each observer continually to reach back in memory to previous experiences for guidance. Ideally all the computations should be made instantly and concurrently to keep continuously in mind the hypothetical future image. Actually, however, human limitations being what they are, the mind roves from one computation to another with inevitable lapses in attention and too often these lapses occur where attention is vitally important.

It is apparent from the foregoing that the scene impinging on the senses of the observer is many stages removed from the scene that will ultimately be projected on the theater screen and that the excessive costs of motion pictures may be traced in large part to the necessity of mentally bridging this wide gap. The most experienced director may fail to picture mentally the final theater image close enough for really economic production and when it is considered that others working with him and on whom he must depend all form different mental pictures at the same time, it is little wonder prevailing film costs are excessive. Effective teamwork is impossible without coordinated thinking based on all members of the team having substantially the same concept of the changing action on the set.

It is an object of the present invention to meet this problem by making the scene that currently impinges on the senses of each observer closely similar to the scene that will ultimately be shown in the theater, thus in effect eliminating the above mentioned gap entirely and bringing all members of the team into close agreement on what is actually being accomplished moment by moment.

Broadly described, this object is attained by coupling an electronic viewer with the motion picture camera for the concurrent production of an electronic image resembling as closely as possible the ultimate theater screen image. As many identical electronic images may be produced at as many stations as desired or required for closely coordinated teamwork.

Such an electronic image automatically eliminates the extraneous margins of the actual scene and, of course, makes automatic conversion from three-dimensions to a flat two-dimensional picture. By use of a suitable viewing booth or control room all distractions from extraneous noises and movements are eliminated. Difficulties arising from differing points of observations are resolved by the one image taken at camera position. Finally, the electronic image used for directing or monitoring the picture may be projected on a screen in close simulation of the atmosphere of a theater and at the same time previews by experts in audience reaction may be made as fast as the scenes are shot.

A particular object of the invention is to approach as closely as possible the character and quality of the ultimate theater image by special control of the light characteristics of the electronic image.

Other objects of the invention are to include in this technique means to check continuously the lighting of the set as well as means for positive assurance of correct camera framing of the scene. These two further provisions save costly footage, since erroneous lighting is often a cause for retakes and too frequently several shots are taken of each scene just to be sure one correct framing is obtained.

The above and other objects of the invention will be apparent in the following description taken with the accompanying drawings.

In the drawings, which are to be regarded as merely illustrative:

Figure 1:
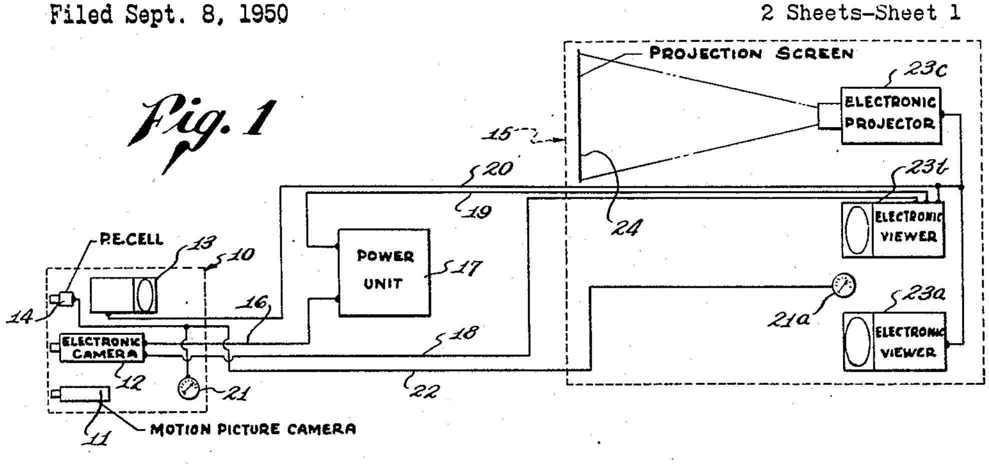
Figure 1 is a diagram showing an arrangement of devices that may be used for practicing the invention.

Figure 1 shows how a single housing represented by the dotted rectangle 10 may enclose a motion picture camera 11, an electronic camera 12 and an electronic viewer 13.

In my preferred practice of the invention, the housing 10 also includes a photoelectric cell 14 for measuring the intensity of light reflected from the scene.

While conceivably the invention may be practiced with advantage by employing a single electronic viewer either at the camera position as shown at least one additional viewer should be provided elsewhere for the director's use. The additional viewer or viewers may, for example, be installed in a remote control room represented by the dotted rectangle 15. A cable 16 connects the electronic camera with a power unit 17 and cables 18, 19 and 20 extend to the control room 15 from the electronic camera 12, the power unit 17 and the electronic viewer 13, respectively.

Figure 2:
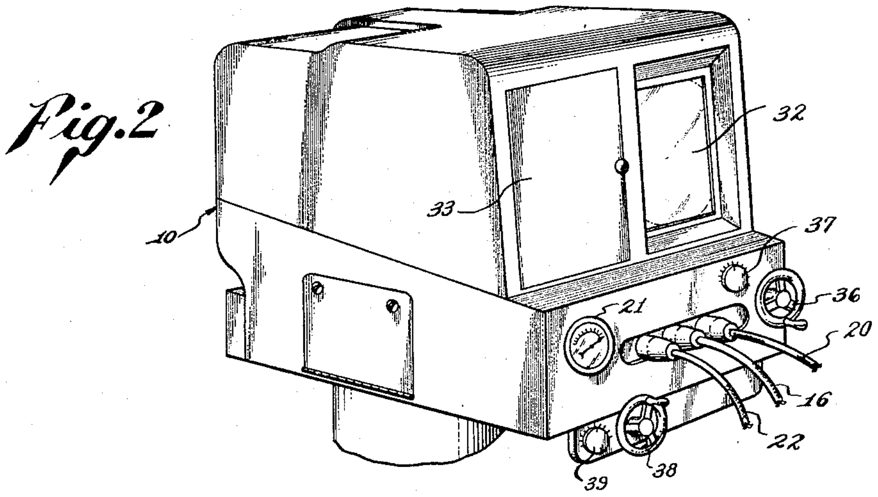
Figure 2 is a perspective view of a combined motion picture camera and an electronic viewer that may be employed in practicing the invention, the view being taken from the side and rear.

The photoelectric cell 14 is suitably connected to a light-meter dial 21 that is mounted to the housing 10 as shown in Figure 2 and is also connected by a cable 22 to a second similar light-meter dial **21*a* in the control room 15. These two dials register the amount of light reaching the photoelectric cell 14**.

In the particular arrangement shown there are two conventional electronic viewers **23*a* and 23*b* with built-in screens and in addition an electronic projector 23*c* that throws an enlarged image on a projection screen 24. All three cables 18, 19 and 20 connect with one of the three viewers in the control room as shown and cable 20 is also connected to the other two viewers. It is contemplated that the first electronic viewer 23*a*** will incorporate an electronic magnifier of a well-known type which, at the expense of voltage on the high voltage side, achieves a gain in sweep of the scanning beam to enlarge the image to twice normal size.

Figure 3:
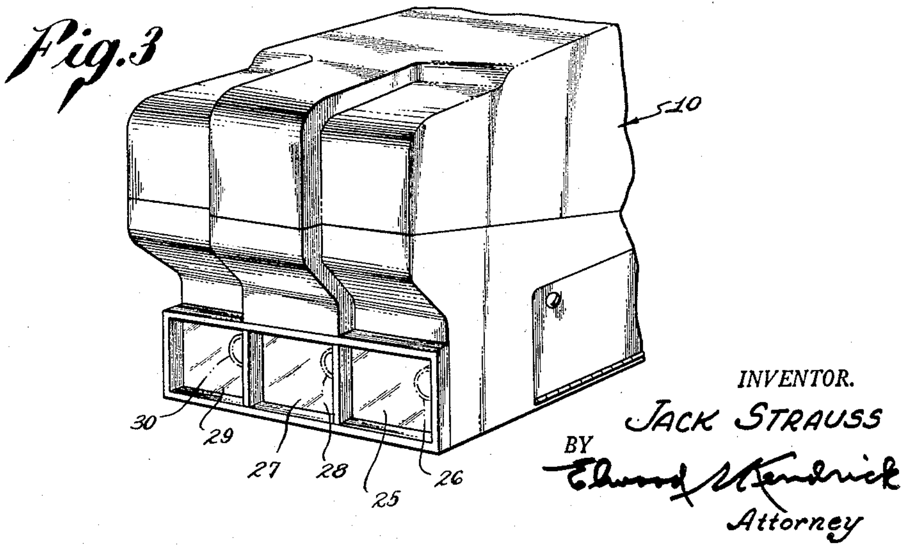
Figure 3 is a similar but fragmentary view taken from the side and front.

Figures 2 and 3 show how the housing 10 may, for example, be constructed with three front windows, namely a window 25 for the lens 26 of the motion picture camera, a window 27 for the lens 28 of the electronic camera and a window 29 for lens 30 that directs light to the photoelectric cell 14. The back of the housing 10 has the viewing screen 32 for the electronic viewer 13 and may have a suitable door 33 for access to the interior of the housing.

As shown in Figure 2, the housing 10 has a manual focusing control in the form of a hand wheel 36 that regulates the focus adjustment of the three lenses 26, 28 and 30 in a synchronous manner. For guidance in making such focus adjustment, a suitable distance-footage indicator is provided. The drawing shows for this purpose a knob 37 that is suitably operated by the manual control 36 and carries an index mark or pointer that traverses an adjacent calibrated scale showing distance in feet.

The housing 10 also has a suitable manual control 38 which in a synchronous manner varies the aperture of "*f*" stop adjustments of the three lenses. Here again for guidance an index may be provided in the form of a knob 39 carrying a mark or pointer that traverses an adjacent scale calibrated in "*f*" values.

Figure 4:
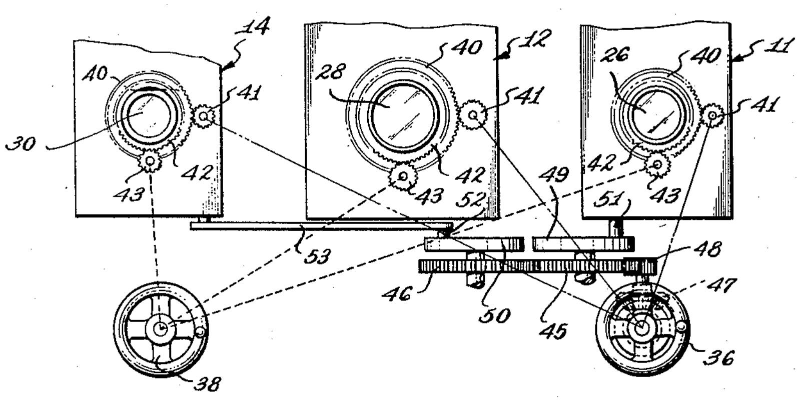
Figure 4 shows schematically how centralized focusing and diaphragm controls may be arranged for the convenience of the camera operation.

Figure 4 shows how these two manual controls 36 and 38 may be operatively related to the three lenses 26, 28 and 30. Each lens assembly is of well-known construction and each has a ring gear 40 regulated by a pinion 41 for changing the focus adjustment of the lens and has a second ring gear 42 regulated by a pinion 43 for varying the "*f*" adjustment of the lens. As indicated by broken lines in Figure 4 the manual control 36 is operatively connected to the three pinions 41 and the manual control 38 is operatively connected to the three pinions 43.

It is contemplated that parallax adjustment with respect to the two cameras 11 and 12 will be made automatically in accord with changes in focus adjustment so that the two cameras will always converge on the same portion of the set that is being photographed. Any of the various suitable parallax adjustment mechanisms known to the art may be employed for this purpose. In the particular arrangement shown in Figure 4 two intermeshed gears 45 and 46 are driven by the manual focus control 36 through means including beveled gearing 47 and a pinion 48. Two wheels 49 and 50 driven by the two gears 45 and 46 respectively have suitable cam grooves on their faces (not shown). A follower 51 rigidly extending from the motion picture camera 11 rides in the cam groove on wheel and a similar follower 52 connected to the photoelectric cell 14 by a rod 53 rides in the cam groove on the wheel 50. By this arrangement both the motion picture camera and the photoelectric cell are swung inward and outward for parallax adjustment.

The operation of the control arrangement shown in Figure 4 will be readily understood by those skilled in the art. For example, if the housing 10 is moved from a camera position twenty feet from the subject being photographed to a new position at only a ten foot distance, the camera operator will change the manual focusing control 36 from the twenty-foot setting to the ten-foot setting. This manipulation of the focusing control 36 will shift the two lenses 26 and 28 forward to their ten-foot settings and simultaneously the described mechanism will rotate the two cameras 11 and 12 to the extent required for corresponding parallax correction.

With the illumination of the scene remaining unchanged this shift in the camera position towards the scene will require stopping down the lens 26 of the motion picture camera correspondingly for proper exposure of the motion picture films. A feature of my invention is the concept of correspondingly varying the admission of light through through lens 28 of the electronic camera and a further feature is the corresponding regulation of the amount of light admitted through the lens 30 to the photoelectric control 14.

By virtue of this arrangement, the light-meter dial 21 on the housing 10 and the light-meter dial 21*a* in the control room 15 serve as means to check the adjustment of the stop diaphragm on the motion picture camera 11. Thus, if the camera operator changes the diaphragm on the motion picture camera to the correct higher "*f*" number when the camera position is moved nearer the scene the corresponding diaphragm adjustment of the lens 30 for the photoelectric cell 14 will make the amount of light reaching the photoelectric cell approximately the same as before the change in camera position. If, on the other hand, the camera operator neglects to stop down the motion picture lens, the light reading at the light-meter dials 21 and 21*a* will shift to a higher value. It is apparent that the two dials should show a constant value or at least a value within a range of toleration for all camera positions and that any departure from that value or range of values for the particular film will indicate that the film is being incorrectly exposed.

An important feature of the preferred practice of my invention is the fact that the responsiveness of the electronic image in the control room to the lighting of the set closely approximates the pattern of light responsiveness of the camera film. This close relationship not only means that the electronic image will be a reliable picture of the future ultimate image on the theater screen but also means that since the electronic image is obtained with a lens synchronized with the motion picture camera lens the electronic image will be a reliable indication of the adjustment of the motion picture camera. Thus, if the motion picture camera is out of focus, the electronic image will be fuzzy; if the motion picture camera lens is open too wide, the electronic image will appear burned out with too intense illumination; and if the motion picture camera lens is stopped down too much the electronic image will be correspondingly dimmed.

I have further discovered that by making the tone range of the electronic image close enough to the tone range of the ultimate picture produced by the motion picture film, the electronic image can be used to check the lighting of the scene with respect to the location of the different light sources for over-all light distribution. Too often it is discovered in the projection room after the film is developed that at some point in the action on the set an unsightly shadow, for example, a shadow across the face of the leading character, appears to spoil the desired effect. Such shadows are often not readily apparent by visual inspection of the scene. They can be detected by focusing the scene on a ground glass for inspection but even then close observation is needed because the ground glass area is relatively small. Moreover, it is not practical to continually check the scene with a ground glass throughout the action.

Figure 5:
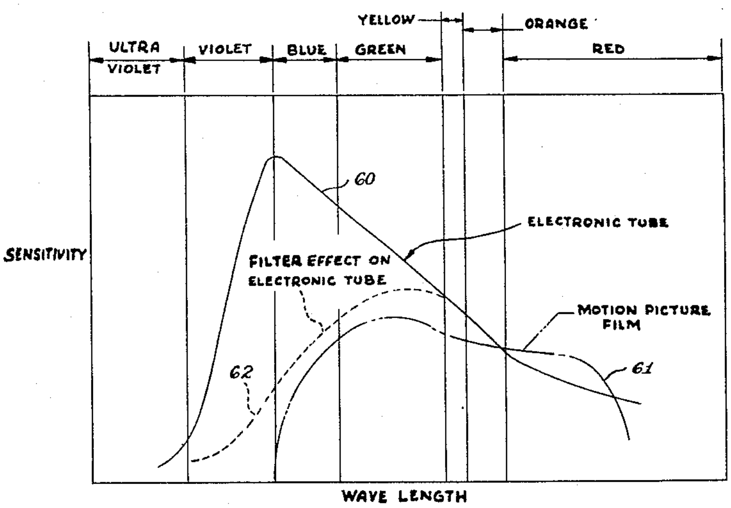
Figure 5 shows graphically certain relationships in sensitivity to light that are of importance in practicing the invention.

I have discovered that the electronic image may be given the desired character that makes these additional advantages possible by simply using a suitable filter on the lens of the television camera. Figure 5 shows by way of example what is accomplished by such a filter.

Curve 60 in Figure 5 shows how the light sensitivity of a common type of television tube is excessive in the high frequencies of the visible spectrum with peak value in the violet-blue zone. In contrast, the light sensitivity of a typical motion picture film such as type B panchromatic film is more evenly distributed over the visible spectrum as indicated by the curve 61 in Figure 5. By using on the electronic camera a filter that selectively reduces the admission of light in and adjacent the blue zone of the visible spectrum, I am able in effect to make the electronic image approximate the image that will be ultimately produced with the motion picture film. The curve 62 in Figure 5 shows the result of employing such a filter to selectively diminish the light reaching the television tube. It will be noted that the correction of curve 60 by the filter results in a configuration having the same general character as the film curve 61.

When such a filter is used the electronic image is not only a reliable indication of the manner in which the motion picture film is being exposed but is also a reliable means for detecting incorrect light and shadow distribution on the scene at any point in the action.

The enlarged image projected on the screen 32 in the control room 15 shows up incorrect lighting in a pronounced manner.

A feature of the described practice of the invention is the unique usefulness of the viewer 21*a* that in effect enlarges a central portion of the image. Such enlarging not only makes it easy to detect incorrect light and shadow distribution but also shows at all times what the effect would be of having the camera closer to the scene.

The utility of the described apparatus for achieving the objects of my invention will be readily apparent to those skilled in the art. Obviously, the arrangement is very flexible and lends itself to various different specific procedures.

In one contemplated practice of the invention, the director will be in the control room 15. The director of photography and/or the chief in charge of set lighting will usually be in the control room along with the director. The director being primarily interested in the script, with emphasis on artistic and emotional values, will view one or more of the available electronic images with these considerations in mind. The director of photography will be concerned with camera technique and picture composition. He will give attention to the light-meter dial 22 to check on the camera setting and will watch one or more of the electronic images for framing and composition. The director of photography will also have in mind, along with the chief of set lighting, how the illumination of the scene appears on the electronic viewer.

Intercommunication with ear phones will be provided so that those in the control room can communicate directly with their respective department members on the set and of course the same electronic image is provided on the set as in the control room.

It will be appreciated that with this or some similar setup all of the various parties working together for the production of the motion picture will have their efforts closely coordinated at all times and since all can refer to the same electronic image, there will always be a meeting of minds as to what is actually being accomplished moment by moment in the course of production. While I prefer to provide the light-meter dial in the control room to indicate the light values at the camera and more particularly to indicate the adjustment of the camera lens with respect to the lighting of the scene, it will be apparent that since the lens of the electronic camera is coupled with the lens of the motion picture camera sole reliance may be placed on the electronic image in the control room to check on the camera adjustment if desired.

It will be apparent to those skilled in the art that various departures may be made from my disclosure within the spirit and scope of my appended claims.

I claim:

1. In a system of the character described for monitoring a motion picture camera, the combination of, an electronic camera covering substantially the same scene as the film camera, an electronic viewer to reproduce the image taken by the electronic camera, and a light filter on the electronic camera intercepting the light received by the television tube therein to compensate substantially for the difference between the sensitivity to the scene lighting on the part of said electronic camera and the motion picture film respectively thereby to give the image at said viewer the same general character as the image subsequently developed on said film whereby the viewer image provides a visual check on the effect of the lighting of said scene on said film.

2. In a system of the character described for monitoring a motion picture camera, the combination of, an electronic camera covering substantially the same scene as the film camera, an electronic viewer to reproduce the image taken by the electronic camera, a light filter on the electronic camera intercepting the light received by the television tube therein to compensate substantially for the difference between the sensitivity to the scene lighting on the part of said electronic camera and the motion picture film respectively thereby to give the image at said viewer the same general character as the image subsequently developed on said film whereby the viewer image provides a visual check on the effect of the lighting of said scene on said film, and a second electronic viewer producing an enlargement of a portion of the image produced by said electronic camera for closer visual check on the lighting on a portion of said scene.

3. In a system of the character described, the combination of a motion picture camera having a lens with an adjustable aperture, an electronic camera covering substantially the same scene as the motion picture camera, a remote control room for monitoring the motion picture camera, an electronic viewer in said control room to reproduce the image taken by the electronic camera, a light meter including a photoelectric cell mounted adjacent the motion picture camera, a variable aperture means to control the amount of light reaching said cell, said aperture means being coupled with and responsive to the aperture adjustment of said camera whereby the amount of light registered by said light meter indicates the degree of exposure of film in said camera, and means in said control room to show the values indicated by said light meter.

4. In a system of the character described, the combination of a motion picture camera having a lens with an adjustable aperture, an electronic camera covering substantially the same scene as the motion picture camera, a remote control room for monitoring the motion picture camera, an electronic viewer in said control room to reproduce the image taken by the electronic camera, a light meter including a photoelectric cell mounted adjacent the motion picture camera, a variable aperture means to control the amount of light reaching said cell, said aperture means being coupled with and responsive to the aperture adjustment of said camera whereby the amount of light registered by said light meter indicates the degree of exposure of film in said camera, and a light filter on the electronic camera intercepting the light received by the television tube therein to compensate substantially for the difference between the sensitivity to the scene lighting on the part of said electronic camera and the motion picture film respectively thereby to give the image at said viewer the same general character as the image subsequently developed on said film whereby the viewer image provides a visual check on the effect of the lighting of said scene on said film.

5. In a system of the character described for monitoring a motion picture camera, the combination of, an electronic camera covering substantially the same scene as the film camera, electronic means to project on a screen an enlargement of the image taken by the electronic camera, and a light filter on the electronic camera intercepting the light received by the television tube therein to compensate substantially for the difference between the sensitivity to the scene lighting on the part of said electronic camera and the motion picture film respectively thereby to give said projected image the same general character as the image subsequently developed on said film whereby the projected image provides a visual check on the effect of the lighting of said scene on said film.

6. In a system of the character described for monitoring a motion picture camera with an adjustable lens, the combination of an electronic camera covering substantially the same scene as the motion picture camera, said electronic camera having an adjustable lens, an electronic viewer to reproduce the image taken by the electronic camera, a filter on the electronic camera intercepting the light received by the television tube therein to compensate substantially for the difference between the sensitivity to the scene lighting on the part of said electronic camera and the motion picture film respectively thereby to give the image at said viewer the same general character as the image subsequently developed on said film whereby the viewer image provides a visual check on the effect of the lighting of said scene on said film, and means interlocking the lens of the motion picture camera with the lens of the electronic camera for synchronous aperture adjustment therein so that variations in the brightness of the image produced by said viewer will indicate variations in the degree of exposure of the film in the motion picture camera.

7. In a system of the character described, the combination of a motion picture camera, an adjacent electronic camera covering substantially the same scene as the motion picture camera, an electronic viewer to reproduce the image taken by the electronic camera, a light meter near the motor picture camera, and automatic means interlocking the two cameras and the light meter for automatic parallax correction among both cameras and the light meter in accord with changes in focus adjustment of the camera.

8. In a system of the character described, the combination of a motion picture camera having an adjustable lens, an electronic camera having an adjustable lens, an electronic viewer to reproduce the image taken by the electronic camera, a light meter having an adjustable lens, said two cameras and light meter being directed towards the same scene, means interconnecting said three lenses for both synchronous aperture adjustment and synchronous focus adjustment, and means for automatic parallax correction in the alignment of the two cameras and the light meter in response to changes in focus adjustment.

9. In a system of the character described, the combination of a motion picture camera having an adjustable lens, an electronic camera having an adjustable lens, an electronic viewer to reproduce the image taken by the electronic camera, a light filter on the electronic camera intercepting the light received by the television tube therein to compensate substantially for the difference between the sensitivity to the scene lighting on the part of said electronic camera and the motion picture film respectively thereby to give the image at said viewer the same general character as the image subsequently developed on said film whereby the viewer image provides a visual check on the effect of the lighting of said scene on said film, a light meter having an adjustable lens, said two cameras and light meter being directed towards the same scene, means interconnecting said three lenses for both synchronous aperture adjustment and synchronous focus adjustment, and means for automatic parallax correction in the alignment of the two cameras and the light meter in response to changes in focus adjustment.

References Cited in the file of this patent

UNITED STATES PATENTS

| | | |
|---|---|---|
| 1,213,485 | Herz | Jan. 23, 1917 |
| 1,447,906 | Snyder et al. | Mar. 6, 1923 |
| 1,583,706 | Tessier | May 4, 1926 |
| 1,934,484 | Camilli | Nov. 7, 1933 |
| 1,974,433 | Riszdorfer | Sept. 25, 1934 |
| 2,032,061 | Kuppenbender | Feb. 25, 1936 |
| 2,058,531 | Tuttle | Oct. 27, 1936 |
| 2,248,986 | Gray | July 15, 1941 |
| 2,250,898 | Tonnies | July 29, 1941 |
| 2,384,232 | Beers | Sept. 4, 1945 |
| 2,419,417 | Omel | Apr. 22, 1947 |
| 2,420,197 | Rosenthal | May 6, 1947 |
| 2,421,476 | Belar et al. | June 3, 1947 |
| 2,421,499 | Guedon | June 3, 1947 |

FOREIGN PATENTS

| | | |
|---|---|---|
| 504,750 | Great Britain | May 1, 1939 |